C. D. KIRK.
CULTIVATOR TOOTH ADJUSTER.
APPLICATION FILED APR. 5, 1910.
979,512.
Patented Dec. 27, 1910.
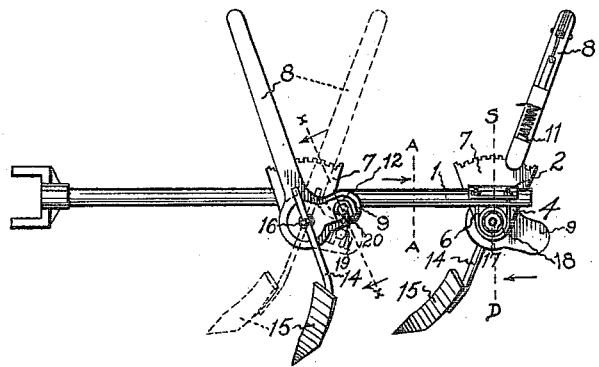
Fig. 1
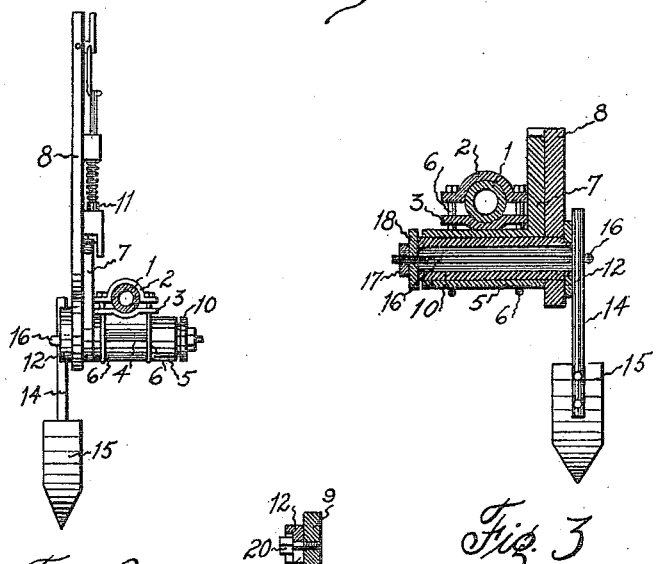
Fig. 2
Fig. 4
Fig. 3
WITNESSES:
J. L. Bowling
L. E. Noack.
INVENTOR
C. D. Kirk
BY
ATTORNEYS.

UNITED STATES PATENT OFFICE.

CARROL D. KIRK, OF MERTENS, TEXAS.

CULTIVATOR-TOOTH ADJUSTER.

979,512.  Specification of Letters Patent.  Patented Dec. 27, 1910.

Application filed April 5, 1910. Serial No. 553,529.

*To all whom it may concern:*

Be it known that I, CARROL D. KIRK, a citizen of the United States, residing at Mertens, in the county of Hill and State of Texas, have invented certain new and useful Improvements in Cultivator-Tooth Adjusters, of which the following is a specification.

My invention relates to new and useful improvements in cultivators and more particularly to a cultivator foot.

The object of my invention is to provide a cultivator foot which will enable the operator to adjust the angle of the cultivator shank to vary the depth of the cultivator shovel.

Another object of my invention is to provide a cultivator foot which may be set at an angle, and which will be normally held rigidly in position at such angle, and which will allow the cultivator shank to swing upward should the cultivator shovel engage with a stone or other objects of a like nature.

Finally the object of the invention is to provide means of the character described that will be strong, durable, efficient, and easy of operation, simple and comparatively inexpensive to construct, and also in which the several parts will not be likely to get out of working order.

With the above and other objects in view, the invention has relation to certain novel features of construction and operation, an example of which is described in this specification and illustrated in the accompanying drawings, wherein:

Figure 1. is a side elevation of my device showing in dotted lines the lever thrown back, Fig. 2. is a transverse section taken on the line *a—a* of Fig. 1 looking in the direction of the arrow, Fig. 3. is a vertical section taken on the line S—D of Fig. 1 looking toward the front of the machine, and Fig. 4. is a section taken on the line *x—x* of Fig. 1 showing the detail construction of the trip foot.

In the drawings the numeral 1 designates a cultivator beam of the usual construction on which are mounted clamps 2 and 3. The clamp 3 is provided with projections 4 which extend down beneath the beam to form a yoke in which a sleeve 5 is supported by U bolts 6. This sleeve carries a toothed segment 7 which extends upward and above the beam. A lever 8 adjacent the segment is loosely mounted on a sleeve 10 extending through the sleeve 5 and carries a rearwardly extending projection 9 and a plunger 11 which engages with the teeth on the segment. After passing through the lever 8 the sleeve 10 is slightly reduced to form a shoulder against which a trip arm 12 is held in fixed relation to the sleeve.

A cultivator shank 14 supporting a cultivator shovel 15 fits in a notch in the face of the arm 12 and is held there by an eye bolt 16 which extends through the sleeve 10 and engages with a nut 17. Between the nut 17 and the sleeve 10 a washer 18 is supported on the eye bolt 16. This washer being of larger diameter the sleeve 10 will engage with the sleeve 5 and will hold the sleeve 10 and the lever 8 in position. At the rear end of the arm 12 a slot 19 is cut and the arm is reduced in thickness to engage over a stud 20 which is screwed into the rearward projection 9 carried by the lever 8.

Although the lever 8 is loosely mounted on the sleeve 10, when it is pulled back it will transmit an upward motion to the stud 20 and will raise the arm 12, thus turning the sleeve 10 in the sleeve 5 and changing the angle of the shank 14 and the cultivator shovel. When the cultivator shovel has been brought to the right position by the hand lever it may be locked in that position by the plunger 11 which engages in the teeth of the segment and will be held normally rigid against the pressure caused by the shovel entering the soil by the lever arm 12 which has frictional engagement with the head of the stud 20. But should the cultivator shovel encounter a stone or stump the shank 14 will be forced back and the end of the arm 12 will rise off of the stud 20 allowing the shovel to slip over the ground.

What I claim is:

1. In a cultivator foot, the combination with the beam of a cultivator, of a sleeve rigidly attached to the beam, a toothed segment attached to the end of the sleeve, a second sleeve passing through the first sleeve and terminating beyond the same at one end, a hand lever mounted on the projecting portion of the second sleeve and having a plunger engaging the segment, a projection extending from the hand lever, a stud extending from the projection, the second sleeve having a squared portion extending beyond the hand lever, a trip arm fixed on the squared portion of the second sleeve and provided with a slot receiving the stud, and a cultivator supported by the second sleeve and in fixed relation to the second sleeve.

2. A cultivator provided with a plow beam, a plow, a sleeve adjustably secured to the plow beam and provided with a notched segment, a hand lever having a sleeve mounted to turn in the first sleeve, a stud supported by the hand lever, a trip arm connected to the second sleeve and having a slot receiving the stud, a plunger on the hand lever engaging the segment, and an eye bolt held in the second sleeve and engaging the shank of the plow for clamping the shank against the second sleeve and the trip arm.

In testimony whereof I have signed my name to this specification in the presence of two subscribing witnesses.

CARROL D. KIRK.

Witnesses:
J. W. KIRK,
E. I. SMITH.